(12) United States Patent
Lee

(10) Patent No.: US 10,063,381 B2
(45) Date of Patent: *Aug. 28, 2018

(54) SECURITY TOKEN FOR CERTIFICATE AUTHENTICATION AND DRIVING METHOD THEREFOR

(71) Applicant: KEYPAIR CO., LTD., Seoul (KR)

(72) Inventor: Jung-Youp Lee, Namyangju (KR)

(73) Assignee: KEYPAIR CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/310,745

(22) PCT Filed: May 8, 2015

(86) PCT No.: PCT/KR2015/004649
§ 371 (c)(1),
(2) Date: Nov. 11, 2016

(87) PCT Pub. No.: WO2015/174696
PCT Pub. Date: Nov. 19, 2015

(65) Prior Publication Data
US 2017/0093585 A1    Mar. 30, 2017

(30) Foreign Application Priority Data

May 12, 2014    (KR) .................. 10-2014-0056106

(51) Int. Cl.
*H04L 29/06*    (2006.01)
*H04L 9/32*    (2006.01)
(Continued)

(52) U.S. Cl.
CPC ............ *H04L 9/3263* (2013.01); *H04L 9/085* (2013.01); *H04L 9/0861* (2013.01); *H04L 9/14* (2013.01);
(Continued)

(58) Field of Classification Search
CPC ......... H04L 9/32; H04L 9/328; H04L 9/3263; H04L 63/823
See application file for complete search history.

(56) References Cited

U.S. PATENT DOCUMENTS

| 8,151,344 B1* | 4/2012 | Channakeshava .... H04L 9/3226 |
| | | 726/19 |
| 2005/0120205 A1* | 6/2005 | Umezawa ........... H04L 63/0442 |
| | | 713/156 |
| 2015/0134561 A1* | 5/2015 | Ashley .................. G06Q 99/00 |
| | | 705/342 |

FOREIGN PATENT DOCUMENTS

| KR | 10-2005-0106416 A | 11/2005 |
| KR | 10-1007375 B1 | 1/2011 |

(Continued)

OTHER PUBLICATIONS

International Search Report for International Patent Application No. PCT/KR2015/004649 filed on May 8, 2015.

*Primary Examiner* — Dao Q Ho

(57) ABSTRACT

The present invention relates to a security token for certificate authentication and a driving method thereof. The security token for certificate authentication, according to the present invention, comprises a security chip comprising: a key pair generation module for generating a pair of a private key and a public key for an authentication certificate; a digital signature module for generating a digital signature on the basis of the authentication certificate; an internal memory for storing the authentication certificate, the private and the public key; a near field communication (NFC) module for performing NFC with a wireless terminal; and a controller for controlling the key pair generation module, the digital signature module, the internal memory, and the NFC module.

11 Claims, 17 Drawing Sheets

(51) Int. Cl.
*H04L 9/08* (2006.01)
*H04L 9/14* (2006.01)
*H04L 9/30* (2006.01)
*G06Q 20/32* (2012.01)
*G06Q 20/40* (2012.01)
*G06Q 40/02* (2012.01)

(52) U.S. Cl.
CPC ............... *H04L 9/30* (2013.01); *H04L 63/06* (2013.01); *H04L 63/0823* (2013.01); *G06Q 20/3223* (2013.01); *G06Q 20/3278* (2013.01); *G06Q 20/4014* (2013.01); *G06Q 40/02* (2013.01); *H04L 2209/80* (2013.01)

(56) References Cited

FOREIGN PATENT DOCUMENTS

| | | |
|---|---|---|
| KR | 10-2011-0030515 A | 3/2011 |
| KR | 10-2011-0078601 A | 7/2011 |
| KR | 10-1226607 B1 | 2/2013 |

* cited by examiner

【 Figure 1】
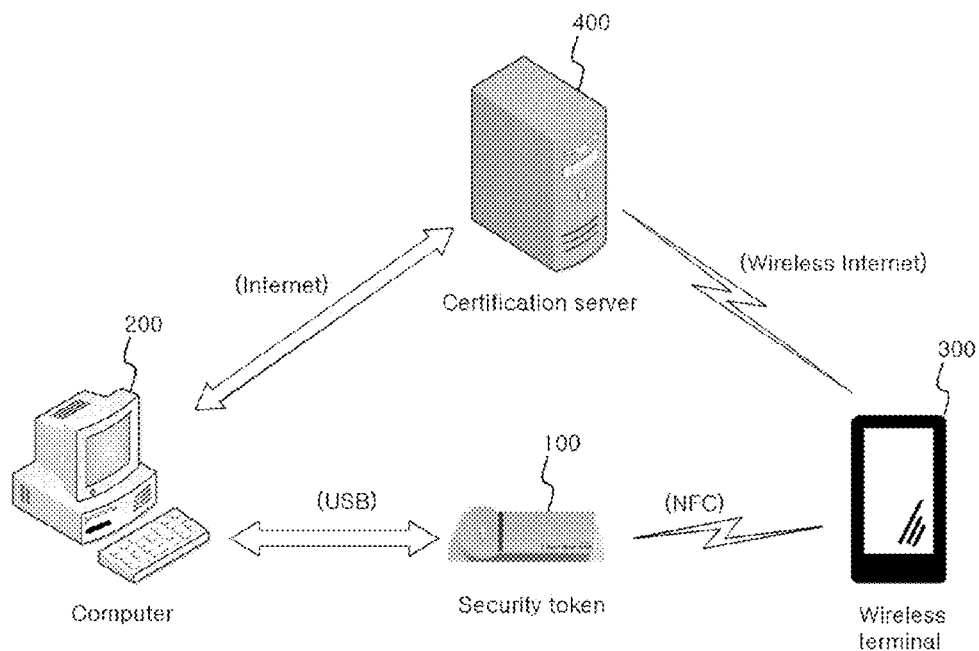

[Figure 2]
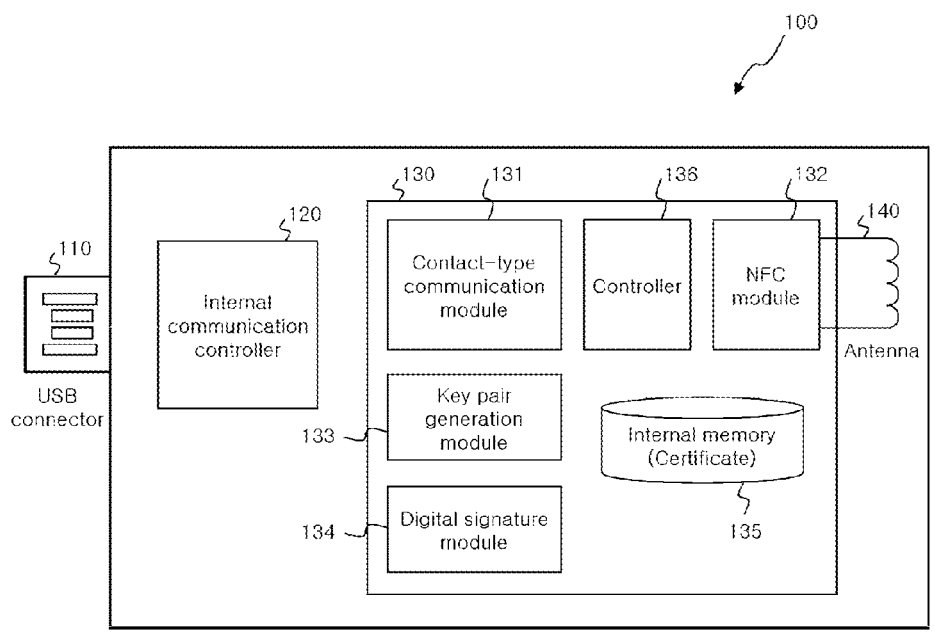

[Figure 3]
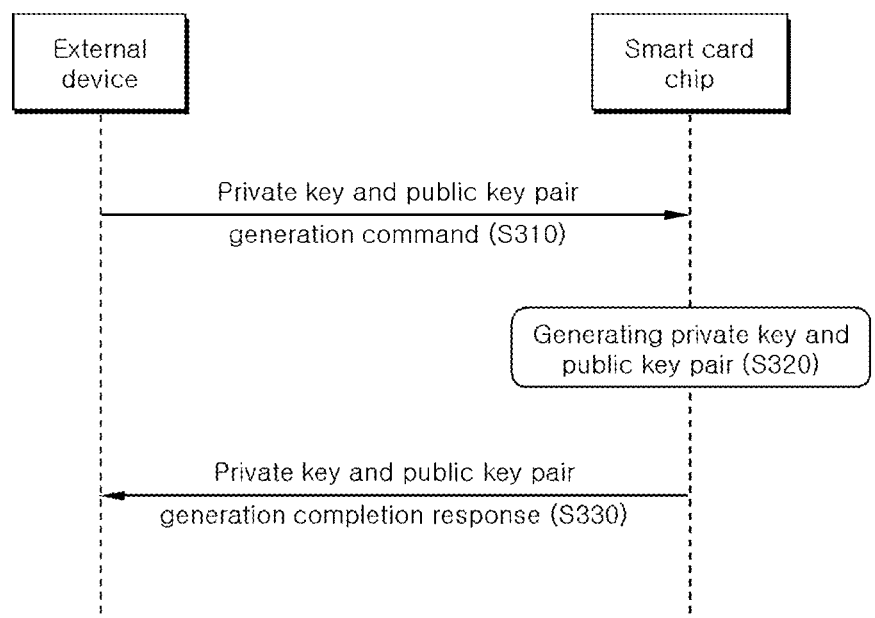

[Figure 4]
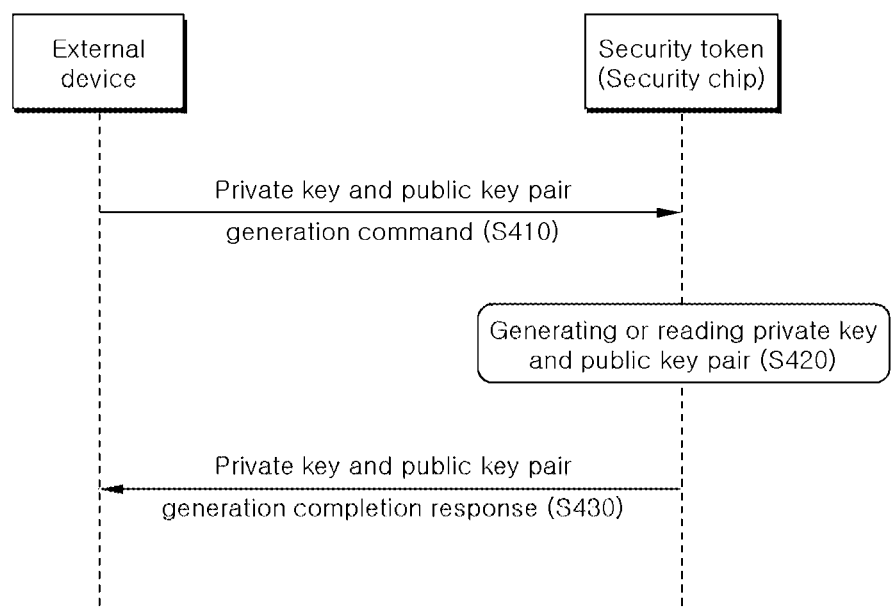

[Figure 5]
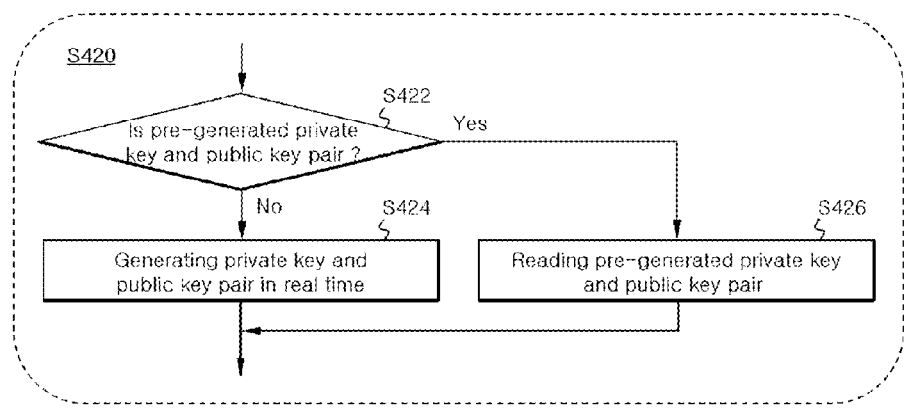

[Figure 6]
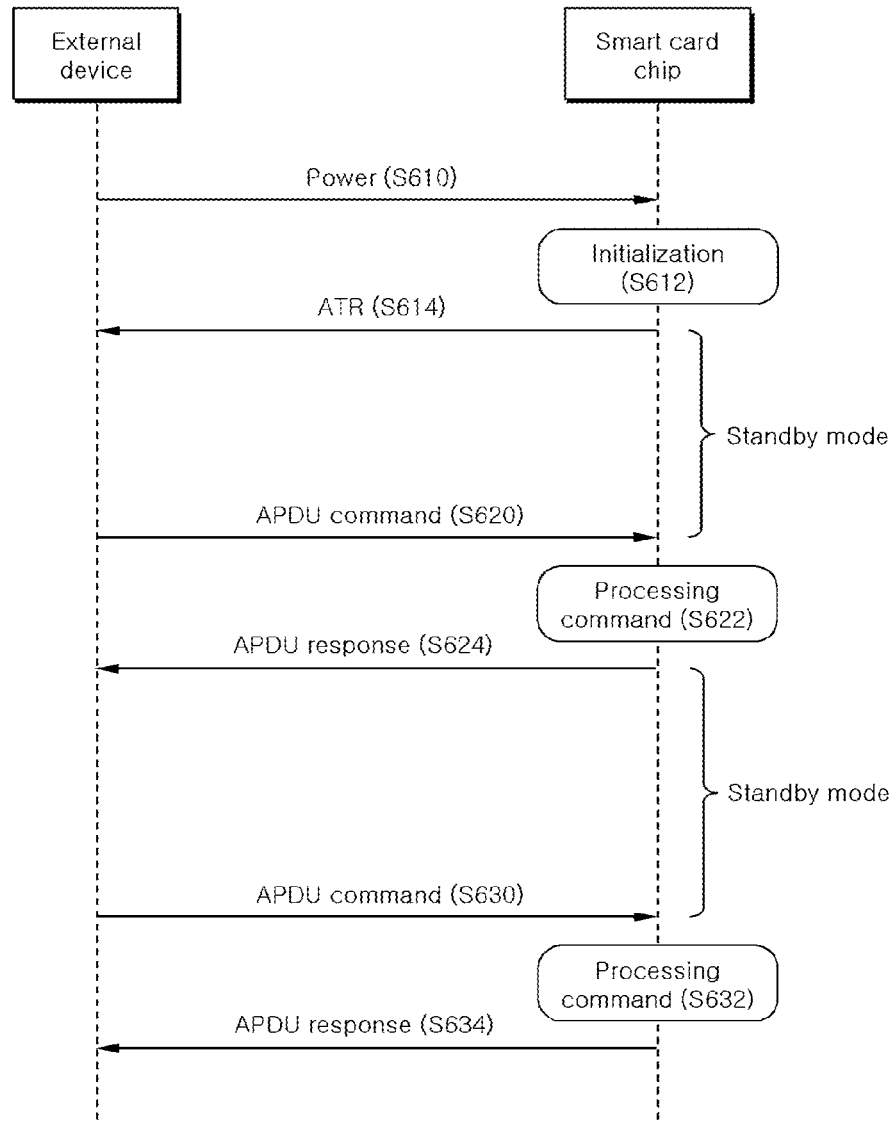

[Figure 7]
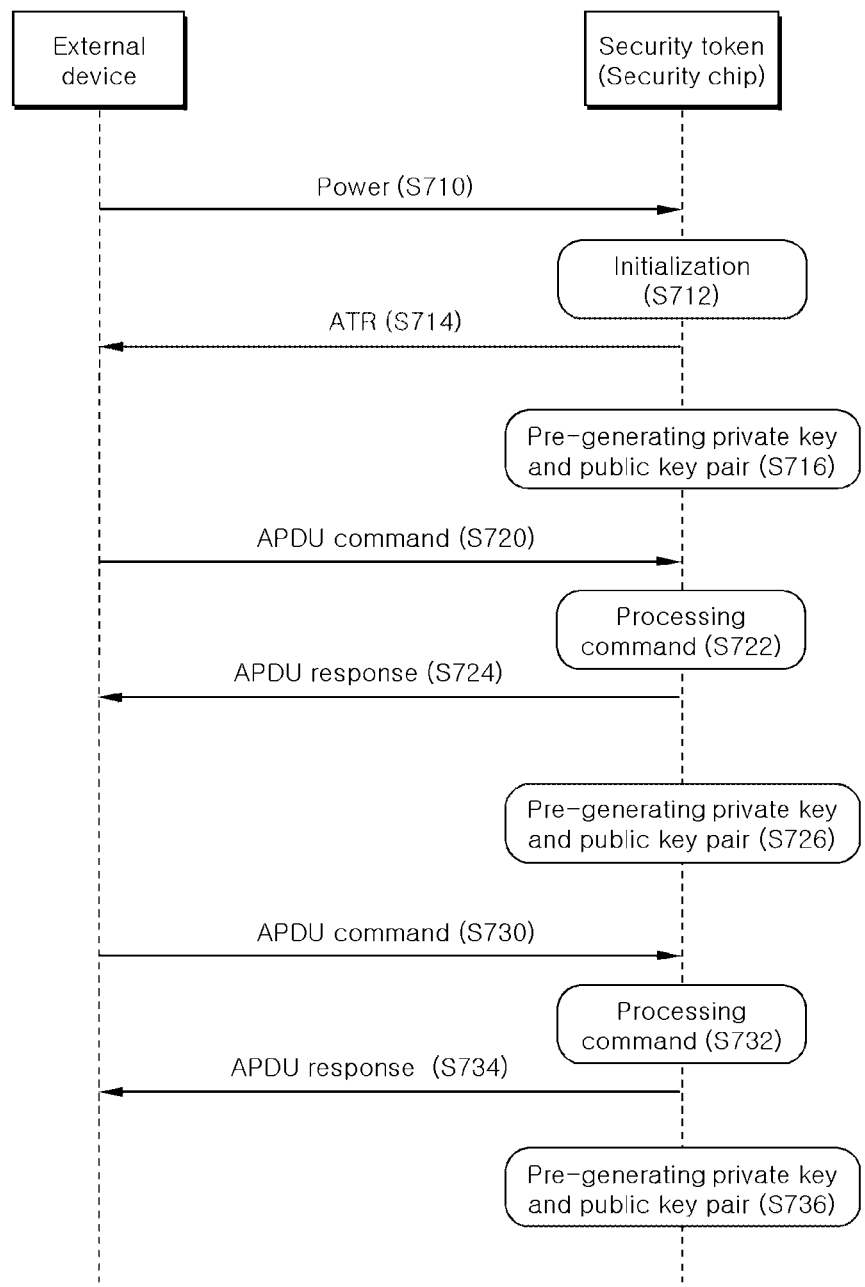

[Figure 8]
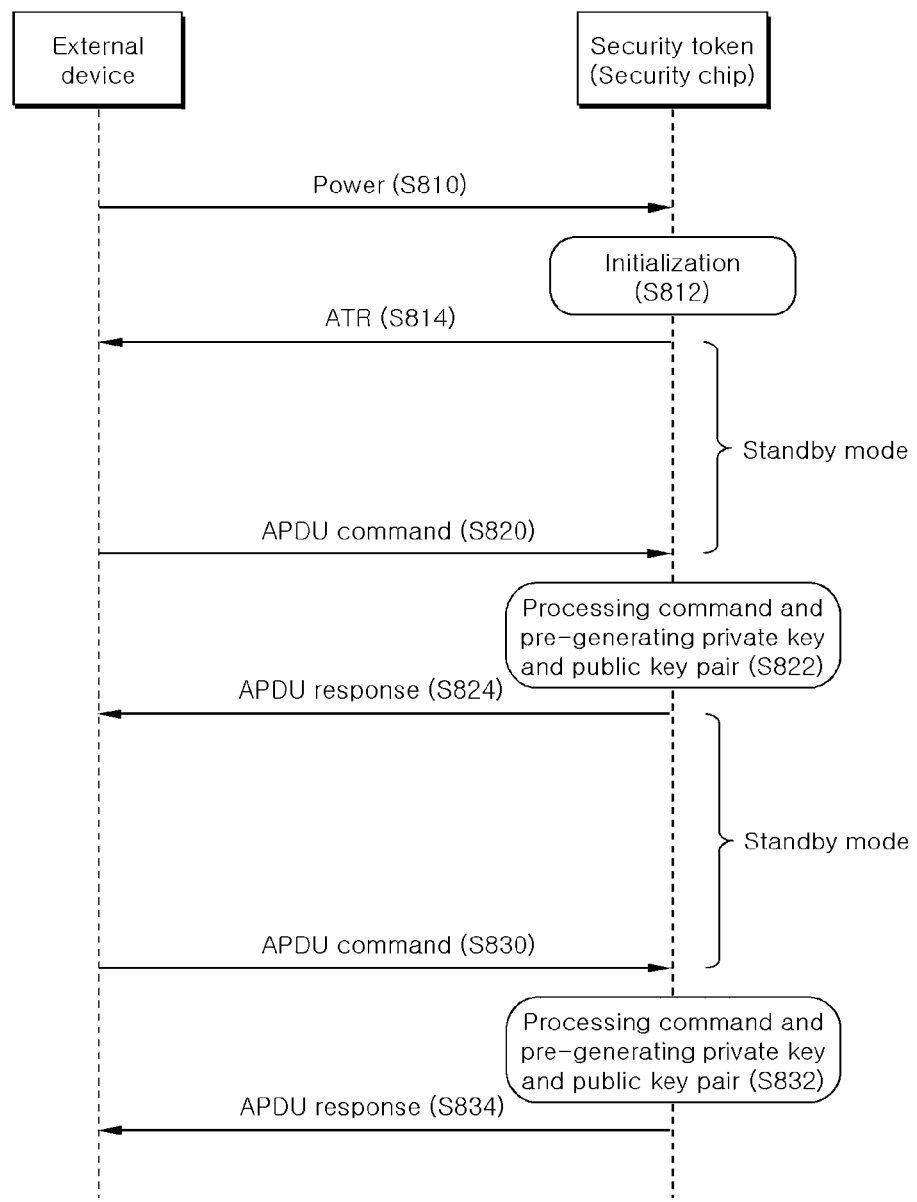

[Figure 9]
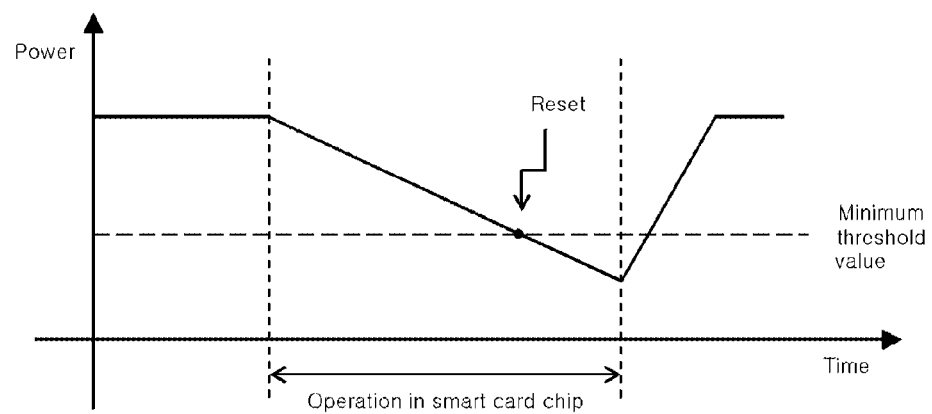

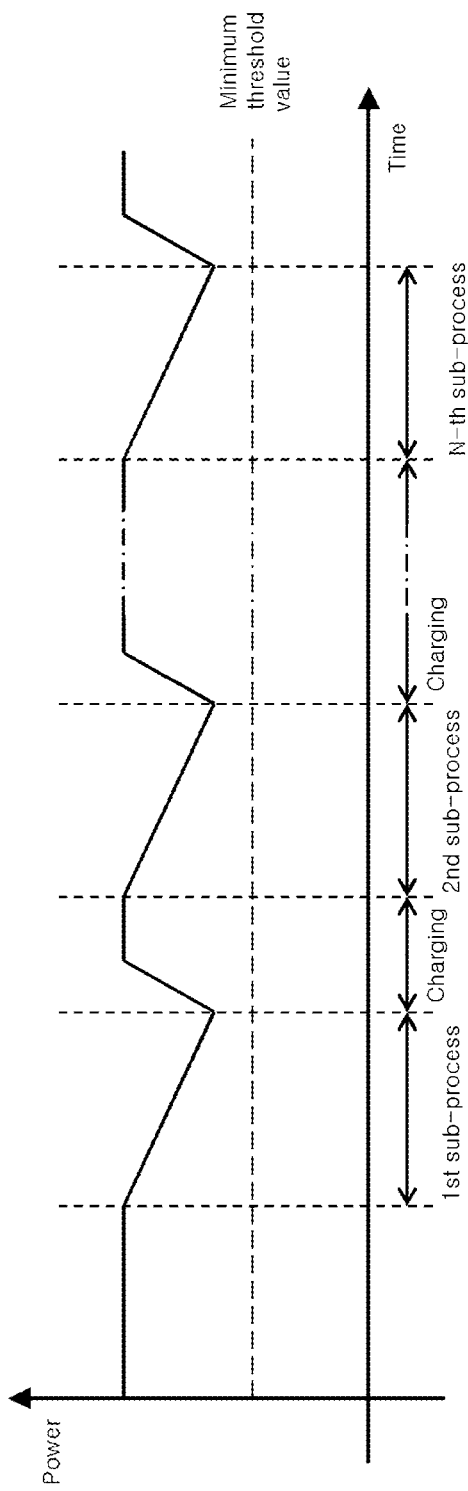

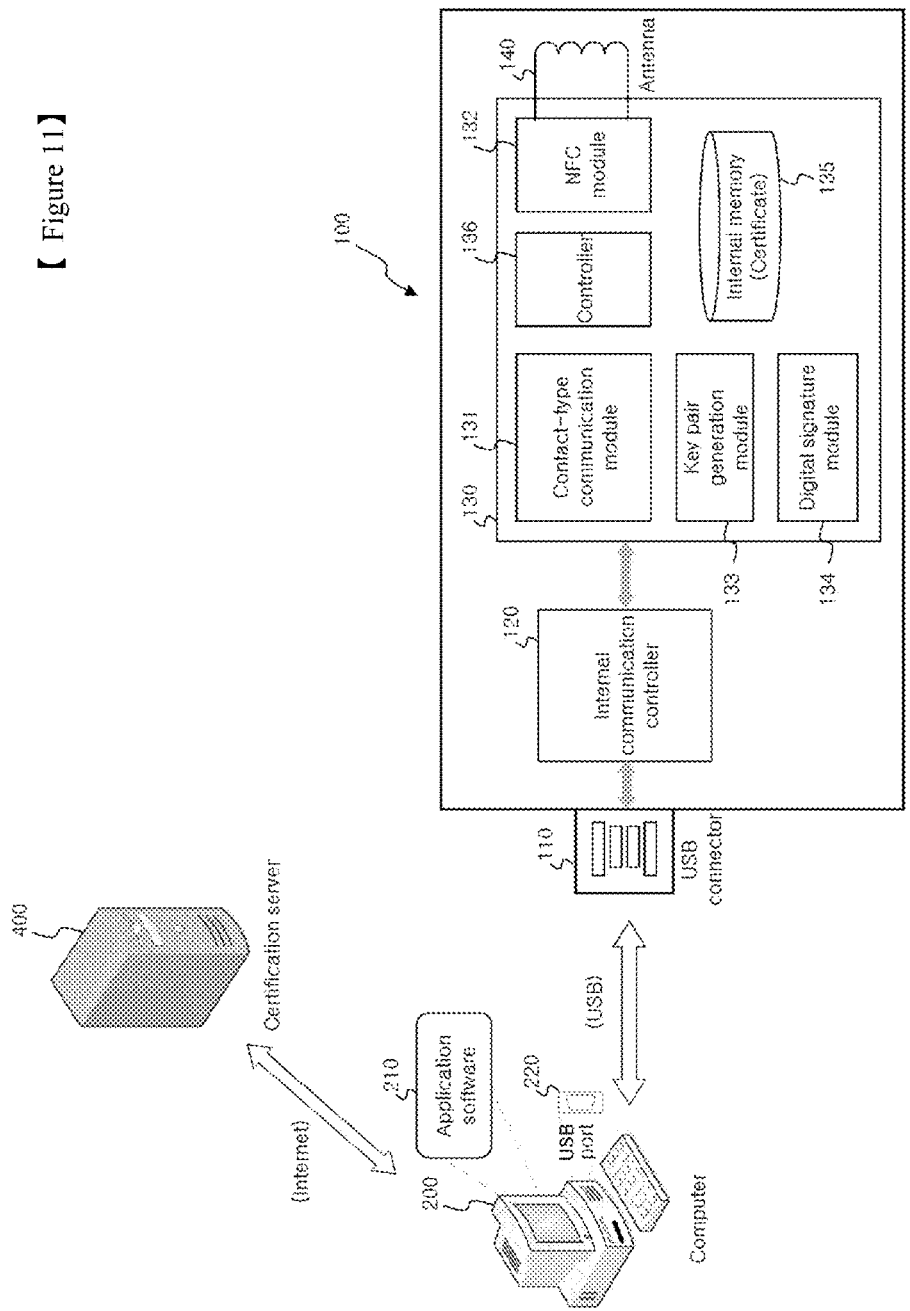

[Figure 12]
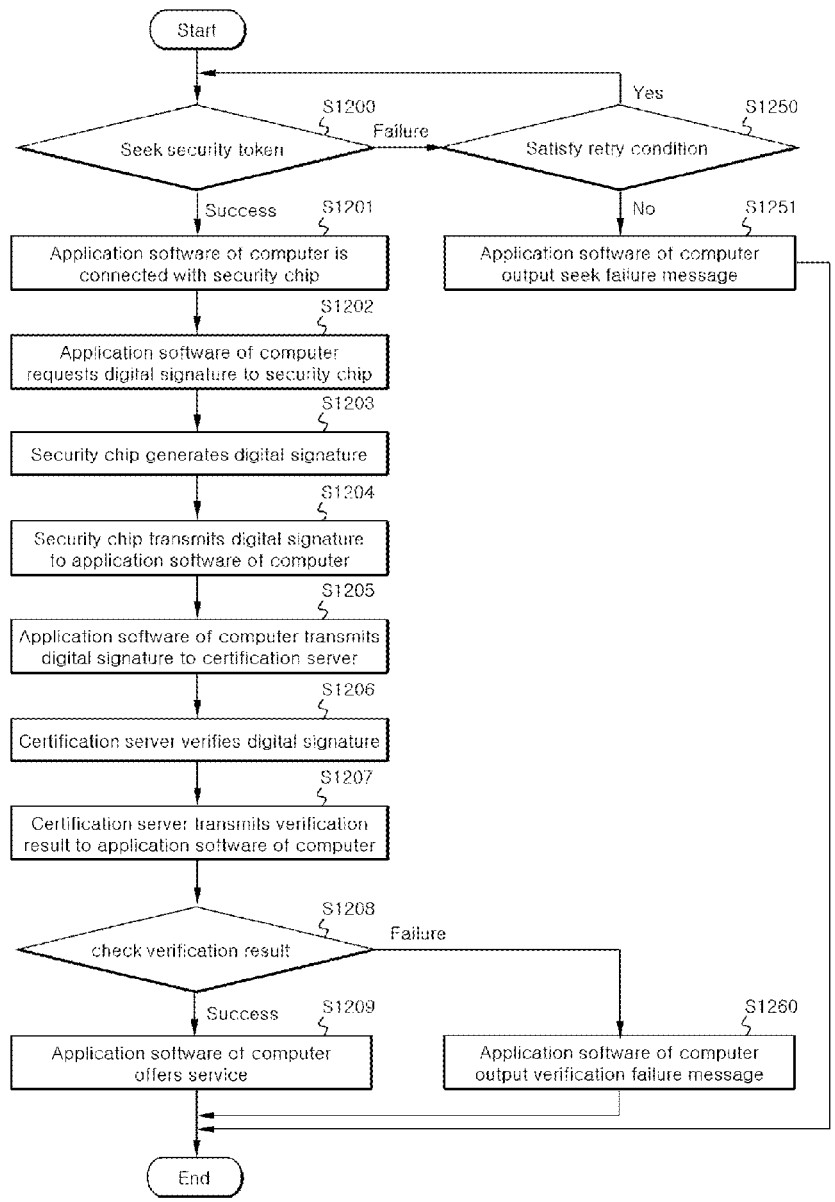

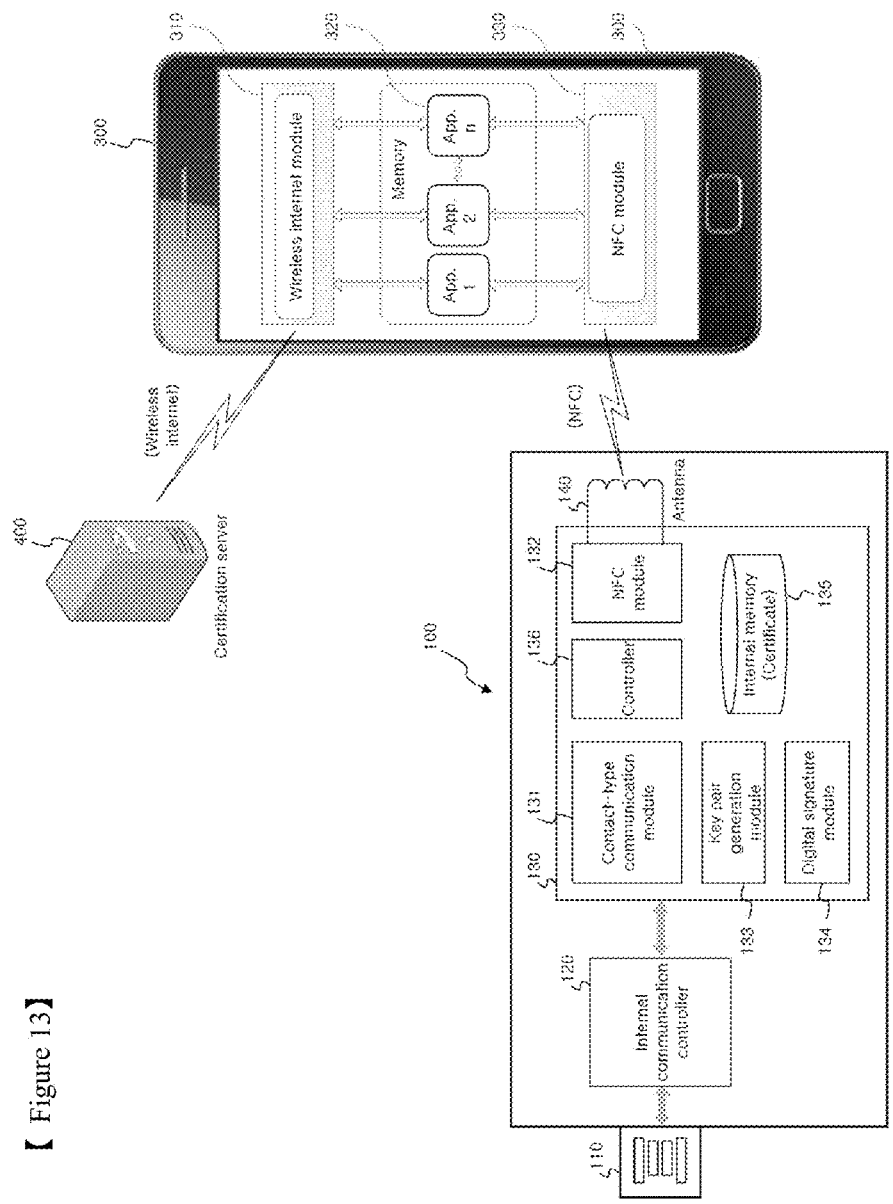
[Figure 13]

[Figure 14]
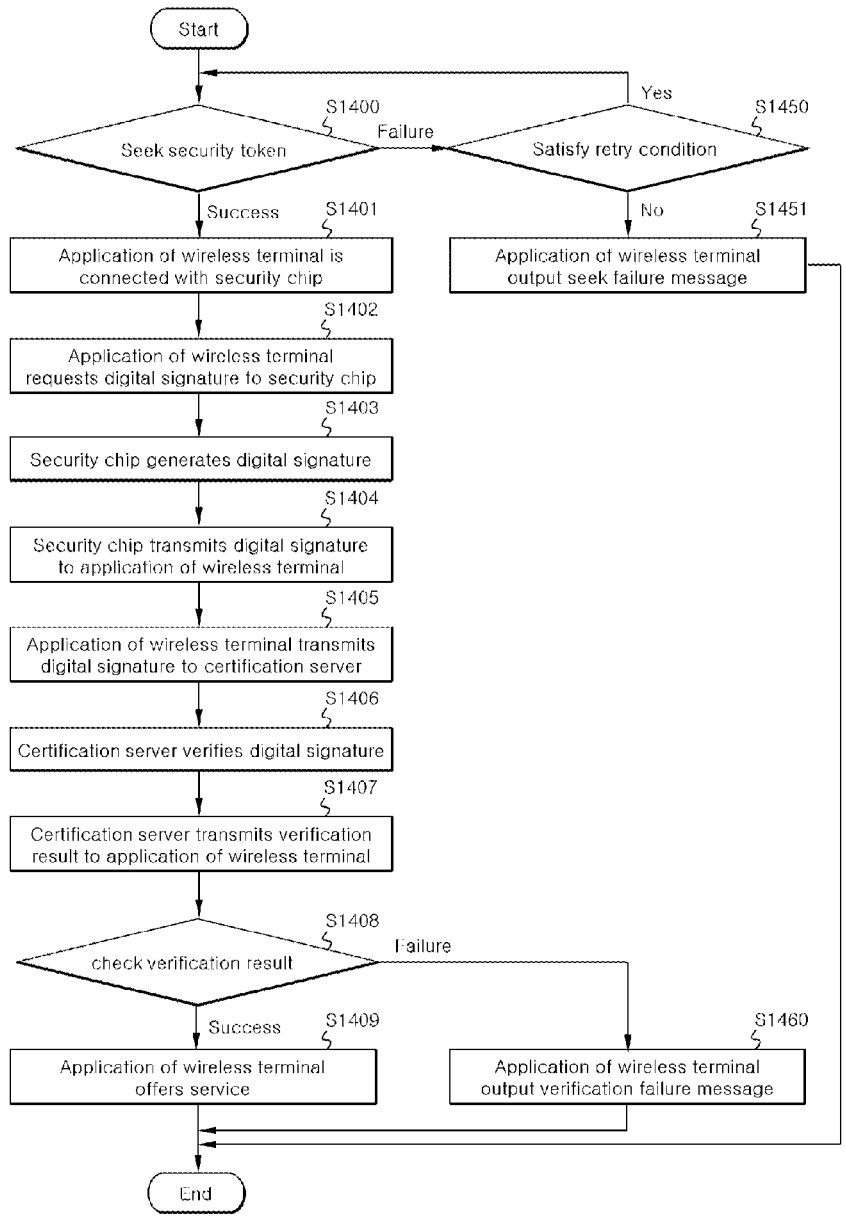

[Figure 15]
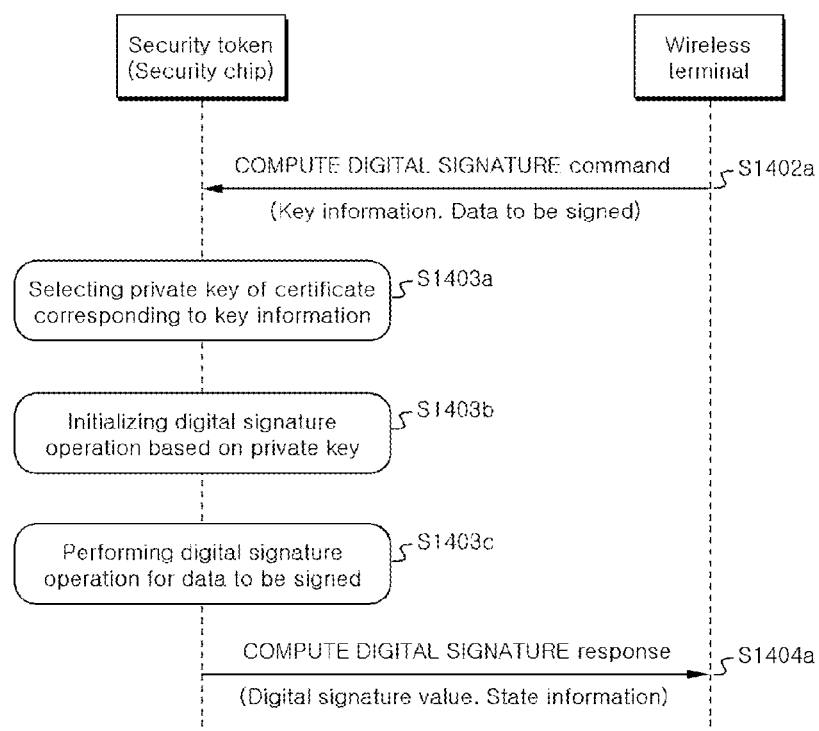

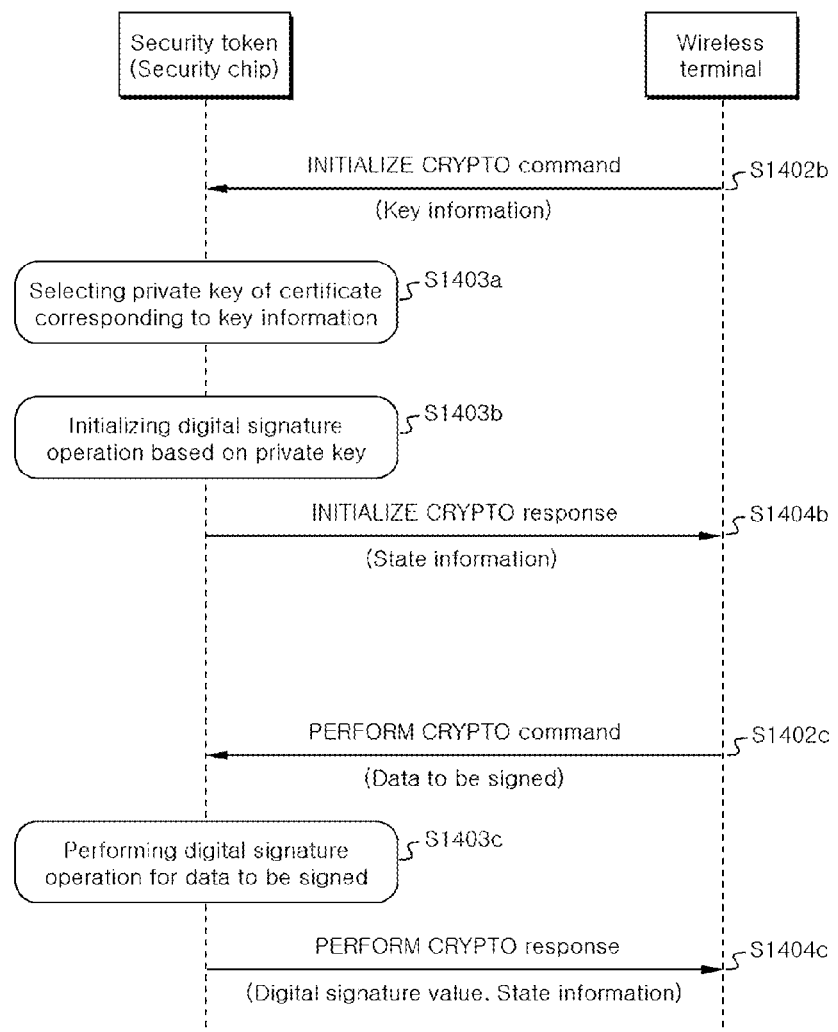
[Figure 16]

[Figure 17]
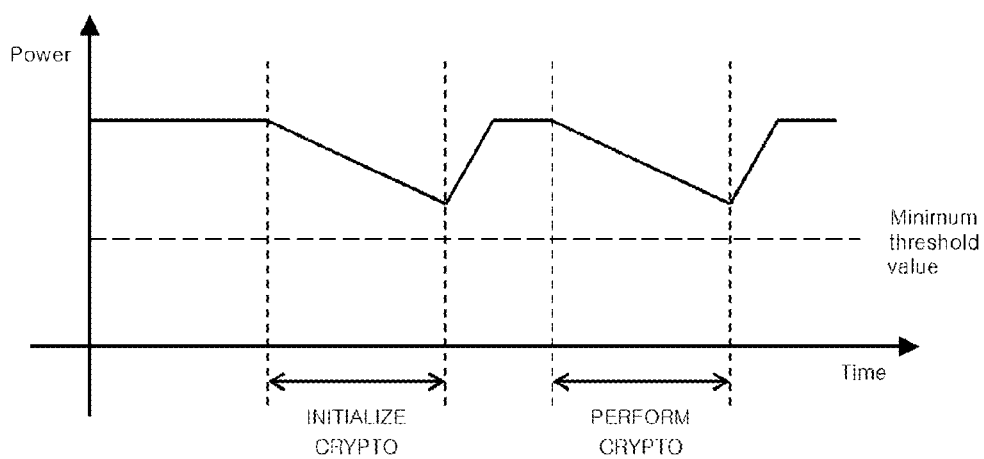

SECURITY TOKEN FOR CERTIFICATE AUTHENTICATION AND DRIVING METHOD THEREFOR

CROSS-REFERENCE TO RELATED APPLICATIONS

The present specification is a U.S. National Stage of International Patent Application No. PCT/KR2015/004649 filed on May 8, 2015, which claims priority to and the benefit of Korean Patent Application No. 10-2014-0056106 filed in the Korean Intellectual Property Office on May 12, 2014, the entire contents of which are incorporated herein by reference.

TECHNICAL FIELD

The present invention relates generally to a security token for certificate authentication and a driving method thereof, and more particularly to a security token for certificate authentication and a driving method thereof wherein a certificate can be used securely and conveniently in both PC environment and smart phone environment.

BACKGROUND ART

A certificate is a certificate for electronic signature which is issued by a certificate authority, and is essentially used in various fields, for example, online certificate issuance, electronic commerce, online stock trading, as well as internet banking. Also, recently, since financial transactions are increasing in smart phone, the use of the certificate is increasing in smart phone.

Looking at the use of the certificate in existing PC (Personal Computer) environment, the certificate is stored in hard disk, portable disk, smart phone, storage token, security token, etc. Then, if a certificate authentication is required for internet financial transactions, a digital signature is generated by using the certificate stored in e.g. hard disk and a certification server verifies it.

However, in case that a certificate is stored in a hard disk or portable disk, a hacking program can easily copy the certificate stored as file type in a folder and easily detect a password of the certificate by monitoring the PC. Therefore, there is a problem that a bank fraud frequently occurs due to hacking. Meanwhile, since the portable disk is exposed to hacking only when it is connected to the PC, it may be regarded that the portable disk is safer than the hard disk. However, the portable disk is likely to be lost and thus a possibility of certificate leakage is high. Meanwhile, in case that the certificate is stored in a smart phone or storage token, the certificate is not stored as file type. However, for certificate authentication, since a digital signature should be performed in the PC, the private key of the certificate may be exposed to the memory of the PC and then a possibility of hacking is still existed.

Therefore, the security token is safest that stores the certificate in the security chip and performs the digital signature in the security chip. Also, the KISA (Korea Internet & Security Agency) recommends the use of the security token. However, the existing security token can be driven only in PC environment. Thus, there is still a problem that the existing security token cannot be used in the smart phone.

In relation to this, looking at the use of the certificate in existing smart phone environment, the certificate issued by the PC is copied into the smart phone and is stored as file type in a folder. Then, various applications use the certificate in common. Alternatively, individual application respectively stores the certificate in its own storage space and uses the certificate.

However, in this case, like the hard disk in PC environment, the certificate stored in the smart phone can be exposed to hacking. Similarly, like the portable disk, the certificate can be exposed due to lost of the smart phone.

Therefore, there is a demand for new scheme that the security token can be used even in the smart phone. In particular, there is a demand for new scheme that the security token can be securely and conveniently used in both PC environment and smart phone environment.

Meanwhile, recently, the KISA (Korea Internet & Security Agency) is working on a certificate cryptosystem upgrading project. The object of this project is to improve a stability of an electronic signature algorithm by raising the length of the private key from 1024-bit to 2048-bit.

At present, in a certificate authentication system, the RSA (Rivest Shamir Adleman) algorithm is used as an electronic signature algorithm. If the RSA algorithm is improved from 1024-bit to 2048-bit, theoretically, it takes about quadruple time or more to perform operations. Specifically, it usually takes 2~3 seconds and in some cases more than 6 seconds to generate a 1024-bit private key and public key pair in a current smart card chip. If a cryptosystem is improved from 1024-bit to 2048-bit, it usually takes 20~30 seconds and in some cases more than 60 seconds to generate a 2048-bit private key and public key pair in the current smart card chip.

Therefore, in case of being issued a 2048-bit certificate by using the security token, a user may feel uncomfortable since it may take more than one minute in an issue process. Hence, the KISA wants to reduce a 2048-bit private key and public key pair generation time in the security token within a few seconds, but a technology solving the above requirement has not yet been suggested.

Hence, there is a demand for new scheme that the security token can efficiently generate the private key and public key pair using NFC in a smart phone environment.

DISCLOSURE

Technical Problem

Therefore, the present invention has been made in view of the above-mentioned demands, and it is an object of the present invention to provide a security token for certificate authentication and a driving method thereof wherein a certificate can be securely and conveniently used in both PC environment and smart phone environment.

It is another object of the present invention to provide a security token for certificate authentication and a driving method thereof wherein a private key and public key pair can be pre-generated using NFC in a smart phone environment.

It is further another object of the present invention to provide a security token for certificate authentication and a driving method thereof wherein a private key and public key pair can be generated in a low power NFC environment by dividing a private key and public key pair generation process into two or more private key and public key pair generation sub-processes.

It is further another object of the present invention to provide a security token for certificate authentication and a driving method thereof wherein a digital signature can be generated using a NFC in a smart phone environment.

It is further another object of the present invention to provide a security token for certificate authentication and a driving method thereof wherein a digital signature can be generated in a low power NFC environment by dividing a digital signature generation process into two or more digital signature generation sub-processes.

Technical Solution

According to one aspect of the present invention, there is provided a security token for certificate authentication which comprises a security chip comprising: a key pair generation module for generating a pair of a private key and a public key for an authentication certificate; a digital signature module for generating a digital signature on the basis of the authentication certificate; an internal memory for storing the authentication certificate, the private and the public key; a near field communication (NFC) module for performing NFC with a wireless terminal; and a controller for controlling the key pair generation module, the digital signature module, the internal memory, and the NFC module.

Preferably, if the security chip receives a private key and public key pair generation command from the wireless terminal, the security chip checks whether a pre-generated private key and public key pair is stored in the internal memory, and if the pre-generated private key and public key pair is stored in the internal memory, the security chip reads pre-generated private key and public key pair.

Also, if the security chip receives a request for digital signature generation preparation from the wireless terminal, by using an energy charged by an electromagnetic wave emitted from the wireless terminal, the security chip selects a private key of a certificate corresponding to key information received by the wireless terminal, initializes a digital signature operation by using the selected private key, and transmits state information to the wireless terminal, and wherein if the security chip receives a request for digital signature generation execution from the wireless terminal, by using the energy recharged by an electromagnetic wave emitted from the wireless terminal, the security chip performs a digital signature operation for data from the wireless terminal and transmits a digital signature value to the wireless terminal.

Meanwhile, according to one aspect of the present invention, there is provided a method for driving a security token for certificate authentication, comprising: receiving a private key and public key pair generation command from a wireless terminal through a near field communication (NFC); checking whether a pre-generated private key and public key pair is stored in the internal memory; and if the pre-generated private key and public key pair is stored in the internal memory, responding a private key and public key pair generation to the wireless terminal through NFC.

Preferably, the method for driving a security token for certificate authentication, further comprising: if the pre-generated private key and public key pair is not stored in the internal memory, generating the private key and public key pair in real time and responding to the wireless terminal through NFC, by using an energy charged by an electromagnetic wave emitted from the wireless terminal.

Advantageous Effects

The present invention can securely and conveniently perform a certificate authentication in a PC environment and/or a smart phone environment.

Also, the present invention can perform a certificate authentication based on a security token through NFC in a smart phone environment. Especially, owing to the use of NFC, a battery is not required. Therefore, it is lighter and easier to carry, and production costs are lower.

Also, the present invention can efficiently minimize a response time corresponding to a request for generating a private key and public key pair since a security token pre-generates and stores the private key and public key pair during standby time.

Also, the present invention can efficiently generate a private key and public key pair in a low power NFC environment by dividing a private key and public key pair generation process into two or more private key and public key pair generation sub-processes.

Also, the present invention can efficiently generate a digital signature in a low power NFC environment by dividing a digital signature generation process into two or more digital signature generation sub-processes.

DESCRIPTION OF THE DRAWINGS

The above and other aspects, features and advantages of the present invention will become more apparent from the following detailed description when taken in conjunction with the accompanying drawings in which:

FIG. 1 is a diagram schematically illustrating a structure of certificate authentication system according to an embodiment of the present invention which is used in PC environment and/or smart phone environment;

FIG. 2 is a diagram illustrating a structure of a security token according to an embodiment of the present invention;

FIG. 3 is a flowchart illustrating a process for generating and using a private key and public key pair in a smart card chip according to the prior art;

FIG. 4 is a flowchart illustrating a process for generating and using a private key and public key pair in a security token according to an embodiment of the present invention;

FIG. 5 is a flowchart illustrating a detailed process for step S420 in FIG. 4;

FIG. 6 is a flowchart illustrating a general process for using a smart card chip;

FIG. 7 is a flowchart illustrating a process for generating a private key and public key pair during standby mode in a security chip according to an embodiment of the present invention;

FIG. 8 is a flowchart illustrating a process for generating a private key and public key pair while processing a command in a security chip according to an embodiment of the present invention;

FIG. 9 is a graph illustrating power change to operation time when a smart card chip according to the prior art is connected with a wireless terminal through NFC;

FIG. 10 is a graph illustrating power change to operation time during a private key and public key pair generation sub-processes, when a security chip according to an embodiment of the present invention is connected with a wireless terminal through NFC;

FIG. 11 is a diagram schematically illustrating that a security token according to an embodiment of the present invention performs a certificate authentication in a PC environment;

FIG. 12 is a flowchart illustrating a method that a security token according to an embodiment of the present invention performs a certificate authentication in a PC environment;

FIG. 13 is a diagram schematically illustrating that a security token according to an embodiment of the present invention performs a certificate authentication in a smart phone environment;

FIG. 14 is a flowchart illustrating a method that a security token according to an embodiment of the present invention performs a certificate authentication in a smart phone environment;

FIG. 15 is a flowchart illustrating a process that a security chip according to an embodiment of the present invention generates a digital signature;

FIG. 16 is a flowchart illustrating another process that a security chip according to an embodiment of the present invention generates a digital signature; and FIG. 17 is a graph illustrating power change to operation time of a security chip in case of FIG. 16.

MODE FOR INVENTION

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

In order to use a security token in both PC environment and smart phone environment, it can be considered that the security token is connected with a PC through USB and is connected with a smart phone (i.e. wireless terminal) through Wi-Fi, Bluetooth, NFC, etc.

However, a battery is required for the security token to be connected with the smart phone through Wi-Fi or Bluetooth. If the battery is embedded in the security token, production costs rise on manufacturer part and charging management is needed on user part. Also, there is a problem that security weaknesses may occur owing to long connection length of Wi-Fi or Bluetooth.

Therefore, the present invention proposes a scheme that the security token is connected with the smart phone (i.e. wireless terminal) through NFC.

FIG. 1 is a diagram schematically illustrating a structure of certificate authentication system according to an embodiment of the present invention which is used in PC environment and/or smart phone environment.

Referring to FIG. 1, the certificate authentication system includes a security token 100, a computer 200, a wireless terminal 300, a certification server 400, etc.

The security token 100 can be connected to both computer and wireless terminal, and be implemented as a HSM (Hardware Security Module) that stores a certificate and generates a digital signature. For example, the security token 100 can communicate with both computer 200 and wireless terminal 300 by performing USB communication with the computer 200 and performing near field communication with the wireless terminal 300. Also, the security token 100 performs a certificate authentication by transmitting a digital signature generated based on an internal certificate to the computer 200 and/or the wireless terminal 300, or directly transmitting the internal certificate to the computer 200 and/or the wireless terminal 300.

The computer 200 performs the certificate authentication by transmitting a digital signature received from the security token 100 through e.g. USB communication to the certification server 400, and thereby e.g. financial service, issuing service, game service, educational service can be offered.

Herein, the computer 200 can be any type of computer, e.g. PC (Personal Computer) or notebook, which can perform USB communication via a USB port and communicate with the certification server 400 through wired or wireless internet.

The wireless terminal 300 performs the certificate authentication by transmitting a digital signature received from the security token 100 through e.g. NFC to the certification server 400 or by generating a digital signature based on a certificate received from the security token 100 through e.g. NFC and transmitting it to the certification server 400, and thereby e.g. financial service, issuing service, game service, educational service can be offered. Herein, the wireless terminal 300 can be any type of wireless terminal, e.g. smart phone or tablet PC, which can perform NFC and communicate with the certification server 400 through wireless internet.

The certification server 400 performs an authentication by verifying the digital signature received from the computer 200 and/or the wireless terminal 300 and informs the result.

FIG. 2 is a diagram illustrating a structure of a security token 100 according to an embodiment of the present invention.

Referring to FIG. 2, the security token 100 according to an embodiment of the present invention may include a USB connector 110, an internal communication controller 120, a security chip 130, an antenna, etc. Herein, the security chip 130 may include a contact-type communication module 131, an NFC module 132, a key pair generation module 133, a digital signature module 134, an internal memory 135, a controller 136, etc.

The USB connector 110 is a device for connecting a USB port 220 of the computer 200 with the security token 100, specifically the internal communication controller 120. Regarding shape of the USB port, type A is general and desirable, but type B, mini-A, mini-B, micro-A, micro-B, etc. are available.

The internal communication controller 120 is a device for controlling USB communication with the computer 200 and contact-type communication the security chip 130. The internal communication controller 120 acts by power supplied from the computer 200 according to the USB standard. The internal communication controller 120 communicates with the computer 200 according to the USB standard, communicates with the contact-type communication module 131 of the security chip 130 according to e.g. ISO7816, transmits a command from an application software 210 of the computer 200 to the security chip 130, and transmits a response from the security chip 130 to the application software 210 of the computer 200. Preferably, the internal communication controller 120 may be implemented as one chip. However, a USB communication controller and a contact-type communication controller can be respectively implemented as an independent chip, or the internal communication controller 120 can be implemented as a part of a universal MCU (Micro Control Unit) or the security chip 130. In case that the internal communication controller 120 is implemented as a part of the security chip 130, the internal communication controller 120 can directly communicate with the controller 136 of the security chip 130 instead of communicating with the contact-type communication module 131 of the security chip 130.

The security chip 130 may include the contact-type communication module 131, the NFC module 132, the key pair generation module 133, the digital signature module 134, the internal memory 135, the controller 136, etc. In case that the security token 100 is connected with the computer 200, the security chip 130 acts by power supplied from the computer 200 and/or the internal communication controller 120 according to e.g. the ISO7816 standard. However, in case that the security token 100 is adjacent to the wireless terminal 300 instead of connecting with the computer 200, the security chip 130 acts by power induced from the antenna 140 through the NFC module 132 of the wireless terminal 300 according to e.g. the ISO14443 standard. Preferably, the security chip 130 may be implemented as fixed type on the board of the security token 100, but the security chip 130 can be implemented as insertion type e.g. SIM (Subscriber Identity Module) type.

The contact-type communication module 131 performs a contact-type communication with the internal communication controller 120. The contact-type communication module 131 communicates with the internal communication controller 120 according to e.g. the ISO7816 standard, receives a command from an application software 210 of the computer 200 through the internal communication controller 120, and transmits a response from the security chip 130 to the application software 210 of the computer 200, likewise, through the internal communication controller 120.

The NFC module 132 performs a communication with a NFC module 330 of the wireless terminal 300. The NFC module 132 communicates with the NFC module 330 of the wireless terminal 300 according to e.g. the ISO14443 standard, receives a command from an application 320 of the wireless terminal 300 through an NFC module 330 of the wireless terminal 300, and transmits a response from the security chip 130 to the application 320 of the wireless terminal 300, likewise, through the NFC module 330 of the wireless terminal 300.

The key pair generation module 133 generates a private key and public key pair which is needed in a certificate issue process. If the key pair generation module 133 receives a private key and public key pair generation command from the computer 200 or the wireless terminal 300 through the contact-type communication module 131 or the NFC module 132, the key pair generation module 133 generates the private key and public key pair under control of the controller 136. Also, according to a preferred embodiment of the present invention, even if the key pair generation module 133 does not receive a private key and public key pair generation command from the computer 200 or the wireless terminal 300, the key pair generation module 133 may pre-generate the private key and public key pair under control of the controller 136 and store it in the internal memory 135. A description for generating the private key and public key pair according to the present invention will be mentioned below.

If the digital signature module 134 receives a digital signature generation command from the computer 200 or the wireless terminal 300 through the contact-type communication module 131 or the NFC module 132, the digital signature module 134 generates a digital signature by using the private key stored in the internal memory 135 under control of the controller 136. A description for generating the digital signature according to the present invention will be mentioned below.

The internal memory 135 is a memory which is in the security chip 130, and can be implemented, for example, as an EEPROM (Electrically Erasable Programmable Read Only Memory). The internal memory 135 stores an operating system for driving the security chip, a private key, a public key, and a certificate, etc. For reference, it is preferable for the certificate to be generated in the security chip 130. However, the certificate generated out of the security chip 130 can be copied into the internal memory 135 of the security chip 130 and be used.

The controller 136 controls the contact-type communication module 131, the NFC module 132, the key pair generation module 133, the digital signature module 134, the internal memory 135, etc. and performs various functions, for example, private key and public key pair generating and storing function, certificate issue and copy function, digital signature generating and transmitting function, password setting and changing function, security token auto-locking function, security token initialization function.

The antenna 140 is connected with the NFC module 132 of the security chip 130 and performs a near field communication (NFC) with the wireless terminal 300. Preferably, the antenna 140 may be fixed on the board of the security token 100. However, if the security chip 130 is implemented as SIM (Subscriber Identity Module) inserted in the security token 100, the antenna 140 can be inserted the SIM.

Hereinafter, with reference to FIGS. 3 to 17, it will now be described that the security token according to an embodiment of the present invention is used in both PC environment and smart phone environment.

Firstly, FIG. 3 is a flowchart illustrating a process for generating and using a private key and public key pair in a smart card chip according to the prior art.

Referring to FIG. 3, in step S310, an external device (e.g. computer, wireless terminal) transmits a private key and public key pair generation command to a smart card chip. In step S320, the smart card chip generates a private key and public key pair. In step S330, the smart card chip responds a private key and public key pair generation completion to the external device.

In this way, the smart card chip according to the prior art generates the private key and public key pair only if the external device requests for generating the private key and public key pair. In this case, as described in Background Art, it takes a long time to generate the private key and public key pair, and in particular, it usually takes 20~30 seconds and in some cases more than 60 seconds to generate a 2048-bit private key and public key pair.

Meanwhile, FIG. 4 is a flowchart illustrating a process for generating and using a private key and public key pair in a security token 100 according to an embodiment of the present invention. And FIG. 5 is a flowchart illustrating a detailed process for step S420 in FIG. 4.

Referring to FIG. 4, in step S410, an external device (e.g. computer, wireless terminal) transmits a private key and public key pair generation command to a smart card chip. In step S420, the security chip 130 of the security token 100 generates a private key and public key pair or reads a pre-generated private key and public key pair.

Specifically, referring to FIG. 5, if the security token 100 receives the private key and public key pair generation command from the computer 200 and/or the wireless terminal 300, in step S422, the controller 136 of the security chip 130 retrieves the pre-generated private key and public key pair from the internal memory 135. If the pre-generated private key and public key pair is not stored in the internal memory 135, in step S424, the controller 136 of the security chip 130 controls the key pair generation module 133 to generate the private key and public key pair in real time. In contrary, if the pre-generated private key and public key pair is stored in the internal memory 135, in step S426, the controller 136 of the security chip 130 reads the pre-generated private key and public key pair from the internal memory 135 without controlling the key pair generation module 133 to generate the private key and public key pair.

Then, in step S430, the security token 100 responds a private key and public key pair generation completion to the computer 200 and/or the wireless terminal 300 through contact-type communication and/or near field communication.

In relation to this, hereinafter, with reference to FIGS. 6 to 10, a private key and public key pair pre-generation process in the security token (the security chip) according to an embodiment of the present invention will now be described.

Firstly, FIG. 6 is a flowchart illustrating a general process for using a smart card chip.

Referring to FIG. 6, in step S610, an external device (e.g. computer, wireless terminal) supplies a power to a smart card chip. In step S612, the smart card chip performs initialization. After completing initialization, in step S614, the smart card chip transmits an ATR (Answer To Reset) signal to the external device. Then, the smart card chip changes into standby mode and waits for receiving an APDU (Application Protocol Data Unit) command from the external device.

In step S620, if the external device transmits the APDU command to the smart card chip, in step S622, the smart card chip escapes from standby mode and processes the command. And, in step S624, the smart card chip transmits an APDU response to the external device. Then, the smart card chip changes into standby mode again and waits for receiving another APDU command from the external device.

Similarly, in step S630, if the external device transmits the APDU command to the smart card chip again, in step S632, the smart card chip escapes from standby mode and processes the command. And, in step S634, the smart card chip transmits the APDU response to the external device. Then, the smart card chip changes into standby mode again and waits for receiving further another APDU command from the external device. Then, these steps are repeatedly performed.

Meanwhile, a security chip of a security token according to an embodiment of the present invention pre-generates and stores a private key and public key pair while waiting for receiving a command from an external device (e.g. computer, wireless terminal). Hereinafter, with reference to FIG. 7, a private key and public key pair pre-generation process will now be described.

FIG. 7 is a flowchart illustrating a process for generating a private key and public key pair during standby mode in a security token according to an embodiment of the present invention.

Referring to FIG. 7, in step S710, an external device supplies a power to a security token. In step S712, the security chip of the security token performs initialization. After completing initialization, in step S714, the security chip of the security token transmits an ATR (Answer To Reset) signal to the external device. Then, in step S716, the security chip of the security token pre-generates and stores the private key and public key pair while waiting for receiving another command from the external device.

In step S720, if the external device transmits an APDU command to the security token, in step S722, the security chip of the security token processes the command. And, in step S724, the security chip of the security token transmits an APDU response to the external device. Then, in step S726, the security chip of the security token pre-generates and stores the private key and public key pair while waiting for receiving further another command from the external device.

Similarly, in step S730, if the external device transmits the APDU command to the security token again, in step S732, the security chip of the security token processes the command. And, in step S734, the security chip of the security token transmits the APDU response to the external device. Then, in step S736, the security chip of the security token pre-generates and stores the private key and public key pair while waiting for receiving further another command from the external device. Then, these steps are repeatedly performed.

For reference, since the external device decides occurrence of error in the security token if the security token does not respond to the APDU command from the external device within a predetermined time period, the security chip of the security token should be able to process the APDU command transmitted from the external device while pre-generating the private key and public key pair.

Therefore, if the security chip of the security token receives the APDU command from the external device during pre-generating the private key and public key pair (see the steps S716, S726, and S736 in FIG. 7), the security chip of the security token temporarily stores current results of the private key and public key pair generation process in the internal memory, processes the received APDU command by priority, and transmits the APDU response to the external device. Then, the security chip of the security token continues the private key and public key pair generation process. If the security chip of the security token cannot temporarily store current results of the private key and public key pair generation process in the internal memory, the security chip of the security token cancels the current private key and public key pair generation process, processes the received APDU command by priority, transmits the APDU response to the external device, and restarts the private key and public key pair generation process.

Meanwhile, the step of pre-generating the private key and public key pair in standby mode, in FIG. 7, has a restriction that power should be consistently supplied to the security token (the security chip). That is, this step can be implemented in case the security token is continuously supplied with power through contact-type communication, e.g. USB communication, or in case the security token is continuously supplied with power induced from outside electromagnetic waves through contactless-type communication, e.g. NFC.

When the security token is connected to a computer through USB communication, the power supplied from the external device is sufficient and the standby mode time for pre-generating the private key and public key pair is sufficient. However, when the security token is connected to a wireless terminal through NFC, the power supplied from the external device may not be sufficient. This is because the wireless terminal generates electromagnetic waves only when it performs near field communication. Thus, it is impossible for an existing security token to generate a 1024-bit private key and public key pair during standby mode.

In order to overcome this restriction, in case that the security token is connected with the wireless terminal through NFC, the present invention suggests that the security chip of the security token generates the private key and public key pair while processing a command.

In relation to this, FIG. 8 is a flowchart illustrating a process for generating a private key and public key pair while processing a command in a security token according to an embodiment of the present invention.

Referring to FIG. 8, in step S810, a wireless terminal supplies a power to a security token through NFC. In step S812, the security chip of the security token performs initialization. After completing initialization, in step S814, the security chip of the security token transmits an ATR (Answer To Reset) signal to the wireless terminal. Then, the security chip of the security token changes into standby mode and waits for receiving an APDU (Application Protocol Data Unit) command from the wireless terminal.

In step S820, if the wireless terminal transmits the APDU command to the security token, in step S822, the security chip of the security token processes the command. In this case, the security chip of the security token generates the private key and public key pair while processing the command. And, in step S824, the security chip of the security token transmits an APDU response to the wireless terminal. Then, the security chip of the security token changes into standby mode again and waits for receiving another APDU command from the wireless terminal.

Similarly, in step S830, if the wireless terminal transmits the APDU command to the security token again, in step S832, the security chip of the security token processes the command and generates the private key and public key pair. And, in step S834, the security chip of the security token transmits the APDU response to the wireless terminal. Then, the security chip of the security token changes into standby mode again and waits for receiving further another APDU command from the wireless terminal. Then, these steps are repeatedly performed.

Meanwhile, the step of processing the command and generating the private key and public key pair together, in FIG. 8, has a restriction that a power enough to generate the private key and public key pair during processing one command should be consistently supplied to the security token (the security chip).

As illustrated in FIG. 9, when the smart card chip is connected to a wireless terminal through NFC, since the power consumed in operation of the smart card chip is larger than the power generated by electromagnetic waves from the wireless terminal, the power is gradually decreased during processing the command. Finally, the power may drop below the minimum threshold value which can drive the smart card chip, and then the smart card chip may be reset.

Therefore, there is a demand for alternative measures that the security chip can efficiently generate the private key and public key pair even if the security chip cannot complete the private key and public key pair generation during processing one command.

According to a preferred embodiment of the present invention, the security chip of the security token divides the private key and public key pair generation process into two or more private key and public key pair generation sub-processes. And, the security chip of the security token performs one or more sub-processes whenever the security chip processes the command. Then, by performing these sub-processes continually, the security chip of the security token completes all of the sub-processes and pre-generates the private key and public key pair. That is, the security chip according to the present invention performs one or more private key and public key pair generation sub-processes during processing one command (see the step S822). Then, if all of the sub-processes are not completed, the security chip of the security token saves current states of the private key and public key pair generation process in the internal memory and temporarily stops the private key and public key pair generation process. Thereafter, the security chip of the security token performs remaining sub-processes during processing the next command (see the step S832) and in this way completes the entire private key and public key pair generation process.

In relation to this, hereinafter, the private key and public key pair generation sub-processes in the smart card chip according to an embodiment of the present invention will now be described.

The private key and public key pair used in the certificate authentication system is, for example, the private key "D" and the public key "(N, E)" in the RSA (Rivest Shamir Adleman) algorithm. The Algorithm for generating the private key "D" and the public key "(N, E)" is as follows.

[Algorithm for Generating the Private Key "D" and the Public Key "(N, E)" of the RSA]

1) Generate different large prime numbers "P" and "Q" which have the same number of digits.
2) Calculate "N=P×Q" and "phi=(P−1)×(Q−1)".
3) Select "E" which satisfies "1<E<phi" and "GCD(E, phi)=1" (where GCD is the greatest common divisor).
4) Calculate "D" which satisfies "1<D<phi" and "E×D=1 (mod phi)" by using the extended Euclidian algorithm.
5) Output the private key "D" and the public key "(N, E)".

In the RSA algorithm, the operation occupying most of operation time is the operation for generating different large prime numbers "P" and "Q" in the step 1). Although there are various ways of generating a large prime number, in an embodiment of the present invention, the smart card chip generates an arbitrary large number and judges whether it is a prime number or a composite number through the Miller-Rabin test.

[Algorithm for Generating a Large Prime Number]

1) Generate an arbitrary large number "Z".
2) Judge whether it is a prime number or a composite number through the Miller-Rabin test.
3) If "Z" is a composite number, return to the step 1).
4) If "Z" is a prime number, output "Z".

[Miller-Rabin Test for an Arbitrary Large Number "Z"]

1) Calculate "S" and "R" which satisfy "Z−1=2S×R" (where "R" is an odd number).
2) Execute the below steps from "i=1" to "i=t" (where "t" is a security parameter and is usually "5" if "Z" is a 1024-bit number).
  2.1) Select an arbitrary number "A" which satisfies "1<A<Z−1".
  2.2) Calculate "Y=$A^R$ mod Z".
  2.3) If "Y" is neither "1" nor "Z−1", execute the below steps.
    2.3.1) Perform "j=1".
    2.3.2) If "j" is smaller than "S" and "Y" is not equal to "Z−1", execute the below steps repeatedly.
      2.3.2.1) Calculate "Y=$Y^2$ mod Z".
      2.3.2.2) If "Y" is equal to "1", output "Composite number" and exit the algorithm.
      2.3.2.3) Perform "j=j+1".
    2.3.3) If "Y" is not equal to "Z−1", output "Composite number" and exit the algorithm.
3) Output "Prime number" and exit the algorithm.

In the Miller-Rabin test, the operation occupying most of operation time is the modular exponentiation operation, e.g. calculation "Y=$A^R$ mod Z" in the step 2.2) and calculation "Y=$Y^2$ mod Z" in the step 2.3.2.1).

Eventually, in case of generating the private key and public key pair used in the certificate authentication system, the operation occupying most of operation time is the modular exponentiation operation.

Therefore, in a preferred embodiment of the present invention, the smart card chip divides into two or more private key and public key pair generation sub-processes based on the modular exponentiation operation and thereby disperses the operation time evenly. For example, the first sub-process of the private key and public key pair generation algorithm is performed until completion of the first modular exponentiation operation, the second sub-process is performed until completion of the second modular exponentiation operation, the $n-1^{th}$ sub-process is performed until completion of the last modular exponentiation operation, and the $n^{th}$ sub-process is performed until completion of the remaining operations of the private key and public key pair algorithm. Thereby, each operation time of the sub-processes is dispersed evenly.

Also, in another preferred embodiment of the present invention, the first sub-process of the private key and public key pair generation algorithm is performed until completion of the first prime number (P) generating operation, the second sub-process is performed until completion of the second prime number (Q) generating operation, and the third sub-process is performed until completion of the remaining operations of the private key and public key pair algorithm.

Meanwhile, FIG. 10 is a graph illustrating power change to operation time during the private key and public key pair generation sub-processes, when a security token according to an embodiment of the present invention is connected with a wireless terminal through NFC.

Referring to FIG. 10, a security chip according to an embodiment of the present invention performs the first sub-process of the private key and public key pair generation algorithm and then is charged to get the required power for the next operation. Similarly, the security chip performs the second sub-process of the private key and public key pair generation algorithm and then is charged to get the required power for the next operation. In this way, the security chip completes the private key and public key pair generation process.

Hereinafter, with reference to FIGS. 11 to 17, it will now be described that the security token according to the present invention performs a certificate authentication.

FIG. 11 is a diagram schematically illustrating that a security token according to an embodiment of the present invention performs a certificate authentication in a PC environment. Also, FIG. 12 is a flowchart illustrating a method that a security token according to an embodiment of the present invention performs a certificate authentication in a PC environment.

As mentioned above, a computer 200 can be any type of computer, e.g. PC (Personal Computer) or notebook, which can perform USB communication via USB port and communicate with a certification server 400 through wired or wireless internet. The computer 200 includes one or more application software 210 and offers various services to users. If a certificate authentication is needed, the computer 200 transmits a digital signature received from a security token 100 to the certification server 400, and offers financial service, issuing service, game service, educational service, etc.

Referring to FIGS. 11 and 12, in step S1200, if the certificate authentication is needed during processing application program, the application software 210 of the computer 200 seeks a security token 100 at USB port 220.

If the application software 210 of the computer 200 finds the security token 100, in step S1201, the application software 210 of the computer 200 is connected with the security chip 130 of the security token 100 through wired channel. In this case, the application software 210 of the computer 200 is connected with the internal communication controller 120 through USB communication, and the internal communication controller 120 is connected with the security chip 130 through e.g. ISO7816 communication.

In step S1202, the application software 210 of the computer 200 transmits key information for digital signature to the security chip 130 and requests a digital signature to the security chip 130, through the wired channel. Then, in step S1203, the security chip 130 reads a private key of a certificate corresponding to the key information from the internal memory 135, and generates the digital signature based on the private key in the digital signature module 134.

In step S1204, the security chip 130 transmits the digital signature to the application software 210 of the computer 200 through the wired channel. Then, in step S1205, the application software 210 of the computer 200 transmits the digital signature to the certification server 400 through wired or wireless internet.

In step S1206, the certification server 400 verifies the digital signature and, in step S1207, transmits a verification result to the application software 210 of the computer 200 through wired or wireless internet.

In step S1208, the application software 210 of the computer 200 checks the verification result. If the verification is a success, in step S1209, the application software 210 of the computer 200 offers financial service, issuing service, game service, educational service, etc and the certificate authentication process is completed.

Meanwhile, if the application software 210 of the computer 200 cannot find the security token 100 in step S1200, in step S1250, the application software 210 of the computer 200 checks retry conditions. Herein, the retry conditions may include predetermined time, predetermined count, time, infinite repetition, etc. Then, if the retry conditions are satisfied, step S1200 and its succeeding steps are performed again.

However, if the retry conditions are not satisfied, in step S1251, the application software 210 of the computer 200 outputs a seek failure message and ends the authentication process.

Meanwhile, if the verification is a failure in step S1208, in step S1260, the application software 210 of the computer 200 outputs a verification failure message and ends the authentication process.

FIG. 13 is a diagram schematically illustrating that a security token according to an embodiment of the present invention performs a certificate authentication in a smart phone environment. Also, FIG. 14 is a flowchart illustrating a method that a security token according to an embodiment of the present invention performs a certificate authentication in a smart phone environment.

As mentioned above, a wireless terminal 300 can be any type of wireless terminal, e.g. smart phone or tablet PC, which can perform NFC and communicate with a certification server 400 through wireless internet. The wireless terminal 300 includes a wireless internet module 310, one or more smart phone applications 320, a NFC module 330, etc. The wireless internet module 310 is a wireless communication module that can be connected to internet through wireless communication by using 3G, 4G, Wi-Fi, Bluetooth, etc. The NFC module 330 performs near field wireless communication at close range, for example within 3~4 cm, preferably within 10 cm. The NFC can be performed at card emulation mode, reader mode, P2P mode, etc. In present invention, it is preferable to be executed at reader mode of the ISO14443 standard. Meanwhile, one or more smart phone applications 330 are installed in the wireless terminal 300 and offer various services to users. If a certificate authentication is needed, the wireless terminal 300 transmits a digital signature received from a security token 100 to the certification server 400, and offers financial service, issuing service, game service, educational service, etc.

Referring to FIGS. 13 and 14, in step S1400, if the certificate authentication is needed during processing application program, the smart phone application 320 of the wireless terminal 300 seeks a security token 100 by using NFC.

If the smart phone application 320 of the wireless terminal 300 finds the security token 100, in step S1401, the application software 320 of the wireless terminal 300 is connected with the security chip 130 of the security token 100 through near wireless channel. In this case, the NFC module 330 of the wireless terminal 300 connects the smart phone application 320 and the security chip 130 through e.g. IS014443 communication.

In step S1402, the smart phone application 320 of the wireless terminal 300 transmits key information for digital signature to the security chip 130 and requests a digital signature to the security chip 130, through the wireless channel. Then, in step S1403, the security chip 130 reads a private key of a certificate corresponding to the key information from the internal memory 135, and generates the digital signature based on the private key in the digital signature module 134.

In step S1404, the security chip 130 transmits the digital signature to the smart phone application 320 of the wireless terminal 300 through the wireless channel. Then, in step S1405, the smart phone application 320 of the wireless terminal 300 transmits the digital signature to the certification server 400 through wireless internet.

In step S1406, the certification server 400 verifies the digital signature and, in step S1407, transmits a verification result to the smart phone application 320 of the wireless terminal 300 through wireless internet.

In step S1408, the smart phone application 320 of the wireless terminal 300 checks the verification result. If the verification is a success, in step S1409, the smart phone application 320 of the wireless terminal 300 offers financial service, issuing service, game service, educational service, etc and the certificate authentication process is completed.

Meanwhile, if the smart phone application 320 of the wireless terminal 300 cannot find the security token 100 in step S1400, in step S1450, the smart phone application 320 of the wireless terminal 300 checks retry conditions. Herein, the retry conditions may include predetermined time, predetermined count, time, infinite repetition, etc. Then, if the retry conditions are satisfied, step S1400 and its succeeding steps are performed again.

However, if the retry conditions are not satisfied, in step S1451, the smart phone application 320 of the wireless terminal 300 outputs a seek failure message and ends the authentication process.

Meanwhile, if the verification is a failure in step S1408, in step S1460, the smart phone application 320 of the wireless terminal 300 outputs a verification failure message and ends the authentication process.

Hereinafter, regarding steps S1402, S1403, and S1404, it will now be described that the security chip according to the present invention generates a digital signature.

FIG. 15 is a flowchart illustrating a process that a security chip according to an embodiment of the present invention generates a digital signature. For reference, FIG. 15 shows that the security chip 130 performs a digital signature process on a single charge.

Referring to FIG. 15, in step S1402a, the wireless terminal 300 transmits a COMPUTE DIGITAL SIGNATURE command with key information for digital signature and data to be signed, to the security chip 130.

Then, in step S1403a, the security chip 130 selects a private key of a certificate corresponding to the key information. In step S1403b, the security chip 130 performs an initialization for digital signature process based on the selected private key. In step S1403c, the security chip 130 performs a digital signature operation for data to be signed, and generates a digital signature value.

Then, in step S1404a, the security chip 130 transmits a COMPUTE DIGITAL SIGNATURE response with the digital signature value and state information, to the wireless terminal 300.

Meanwhile, as mentioned above, NFC is a scheme that the security token 100 directly generates power by an electromagnetic wave emitted from the wireless terminal and performs a communication. Therefore, a battery is not required and a security is better owing to short connection length. However, there is a problem that the security token cannot easily generate power enough to perform the digital signature.

Hence, there is a demand for alternative scheme that the security chip of the security token can efficiently perform the digital signature with minimum power even if an electromagnetic wave emitted from the wireless terminal is relatively weaker. Hereinafter, with reference to FIGS. 16 and 17, it will now be described.

FIG. 16 is a flowchart illustrating another process that a security chip according to an embodiment of the present invention generates a digital signature. For reference, FIG. 16 shows that the security chip 130 performs a digital signature process on two or more charges by dividing a digital signature process into two or more digital signature sub-processes.

Referring to FIG. 16, in step S1402b, the wireless terminal 300 transmits a INITIALIZE CRYPTO command with key information for digital signature, to the security chip 130. For reference, this is a step that the wireless terminal 300 requests for digital signature generation preparation to the security chip 130.

Then, in step S1403a, the security chip 130 selects a private key of a certificate corresponding to the key information. In step S1403b, the security chip 130 performs an initialization for digital signature process based on the selected private key. In step S1404b, the security chip 130 transmits an INITIALIZE CRYPTO response with state information, to the wireless terminal 300.

Thereafter, in step S1402c, the wireless terminal 300 transmits a PERFORM CRYPTO command with data to be signed, to the security chip 130. For reference, this is a step that the wireless terminal 300 requests for digital signature execution to the security chip 130.

Then, in step S1403c, the security chip 130 performs a digital signature operation for data to be signed, and generates a digital signature value. In step S1404c, the security chip 130 transmits a PERFORM CRYPTO response with the digital signature value and state information, to the wireless terminal 300.

Referring to FIG. 17, a digital signature process with the INITIALIZE CRYPTO command and PERFORM CRYPTO command is divided into two or more sub-processes. Specifically, the security chip 130 performs and completes INITIALIZE CRYPTO command before power of the security chip 130 drops below minimum threshold value. Then, the security chip 130 is charged while the wireless terminal 300 processes INITIALIZE CRYPTO response and prepares PERFORM CRYPTO command. Thereafter, likewise, the security chip 130 performs and completes PERFORM CRYPTO command before power of the security chip 130 drops below minimum threshold value. In this way, the digital signature process is performed normally.

Referring to back to FIG. 2, according to a preferred embodiment of the present invention, the security token 100 performs various functions, for example, password setting and changing function, certificate copy and backup function, security token auto-locking function, security token initialization function, besides certificate authentication function.

Specifically, the controller 136 of the security chip 130 may receive a password from a user through e.g. USB communication, and store the password in the internal memory 135. Then, if a certificate authentication is needed, the controller 136 of the security chip 130 may request to enter the password and verify whether the user is entitled. Also, if a user requests change of password, the controller 136 of the security chip 130 checks a previous password and stores a new password in the internal memory 135. Meanwhile, if a password entered by a user is not correct over a predetermined retry times (e.g. 5 times), the controller 136 of the security chip 130 may auto-locking function by non-activating the security token automatically. Then, the controller 136 of the security chip 130 performs initialization function by initializing the security token according to an initialization command from the user.

While the invention has been shown and described with reference to a certain preferred embodiment thereof, it will be understood by those skilled in the art that various changes in form and details may be made therein without departing from the spirit and scope of the invention as defined by the appended claims.

The invention claimed is:

1. A security token for certificate authentication which comprises a security chip comprising:
   a key pair generation module for generating a pair of a private key and a public key for an authentication certificate;
   a digital signature module for generating a digital signature on the basis of the authentication certificate;
   an internal memory for storing the authentication certificate, the private and the public key;
   a near field communication (NFC) module for performing NFC with a wireless terminal; and
   a controller for controlling the key pair generation module, the digital signature module, the internal memory, and the NFC module,
   wherein in response to the security chip receiving a command from the wireless terminal, the security chip pre-generates the private key and public key pair through the key pair generation module while waiting to receive a further command after processing the command,
   wherein in response to the security chip receiving a request for digital signature generation preparation from the wireless terminal, by using an energy charged by an electromagnetic wave emitted from the wireless terminal, the security chip selects a private key of a certificate corresponding to key information received by the wireless terminal, initializes a digital signature operation by using the selected private key, and transmits state information to the wireless terminal,
   wherein in response to the security chip receiving a request for digital signature generation execution from the wireless terminal, by using the energy recharged by an electromagnetic wave emitted from the wireless terminal, the security chip performs a digital signature operation for data from the wireless terminal and transmits a digital signature value to the wireless terminal,
   wherein the security chip generates the private key and public key pair by dividing a private key and public key pair generation process into two or more private key and public key pair generation sub-processes, and
   wherein in response to a password entered by a user being not correct over a predetermined retry times, the security chip inactivates the security token.

2. The security token of claim 1, wherein in response to the security chip receiving a private key and public key pair generation command from the wireless terminal, the security chip determines whether a pre-generated private key and public key pair is stored in the internal memory, and in response to determining that the pre-generated private key and public key pair is stored in the internal memory, the security chip reads the pre-generated private key and public key pair.

3. The security token of claim 2, wherein in response to determining that the pre-generated private key and public key pair is not stored in the internal memory, the security chip generates the private key and public key pair in real time through the key pair generation module.

4. The security token of claim 1, wherein in response to the security chip receiving a command from the wireless terminal, the security chip pre-generates the private key and public key pair through the key pair generation module during processing the command.

5. The security token of claim 1, wherein the security chip divides the private key and public key pair generation process into two or more private key and public key pair generation sub-processes based on a modular exponentiation operation.

6. The security token of claim 1, wherein the security chip divides the private key and public key pair generation process into two or more private key and public key pair generation sub-processes based on a prime number generating operation.

7. The security token of claim 1, wherein the security chip allocates charging time between each of private key and public key pair generation sub-processes.

8. The security token of claim 1, wherein the security chip initializes the security token according to an initialization command entered by a user.

9. The security token of claim 1, wherein the security token further comprises a USB connector for connecting a USB port of a computer; and an internal communication controller for controlling a USB communication with the computer through the USB connector and controlling a wired communication with the security chip by connecting with the security chip or being embedded in the security chip.

10. A method for driving a security token for certificate authentication, comprising:
   receiving a private key and public key pair generation command from a wireless terminal through a near field communication (NFC);
   determining whether a pre-generated private key and public key pair is stored in the internal memory;
   in response to determining that the pre-generated private key and public key pair is stored in the internal memory, responding a private key and public key pair generation to the wireless terminal through NFC;

in response to receiving a command from the wireless terminal, pre-generating the private key and public key pair through the key pair generation module while waiting to receive a further command after processing the command;

in response to receiving a request for digital signature generation preparation from the wireless terminal, by using an energy charged by an electromagnetic wave emitted from the wireless terminal, selecting a private key of a certificate corresponding to key information received by the wireless terminal, initializing a digital signature operation by using the selected private key, and transmitting state information to the wireless terminal;

in response to receiving a request for digital signature generation execution from the wireless terminal, by using the energy recharged by an electromagnetic wave emitted from the wireless terminal, performing a digital signature operation for data from the wireless terminal and transmitting a digital signature value to the wireless terminal;

receiving a request for digital signature generation preparation from the wireless terminal;

selecting a private key of a certificate corresponding to key information received by the wireless terminal, initializing a digital signature operation by using the selected private key, and transmitting state information to the wireless terminal, by using an energy charged by an electromagnetic wave emitted from the wireless terminal;

receiving a request for digital signature generation execution from the wireless terminal; and performing a digital signature operation for data from the wireless terminal and transmitting a digital signature value to the wireless terminal through NFC, by using the energy recharged by an electromagnetic wave emitted from the wireless terminal.

11. The method of claim 10, further comprising:

in response to determining that the pre-generated private key and public key pair is not stored in the internal memory, generating the private key and public key pair in real time and responding to the wireless terminal through NFC, by using an energy charged by an electromagnetic wave emitted from the wireless terminal.

\* \* \* \* \*